United States Patent [19]

Hirose

[11] Patent Number: 5,682,657
[45] Date of Patent: Nov. 4, 1997

[54] PUNCH PRESS EQUIPPED WITH MARKING APPARATUS AND METHOD FOR MARKING BY THE PUNCH PRESS

[75] Inventor: Shunzo Hirose, La Mirada, Calif.

[73] Assignee: Amada Mfg America Inc., La Mirada, Calif.

[21] Appl. No.: 615,610

[22] Filed: Mar. 13, 1996

[51] Int. Cl.$^6$ .................................................. B23P 23/04
[52] U.S. Cl. ................... 29/33 J; 29/40; 29/560; 83/552; 101/3.1
[58] Field of Search ......................... 29/560, 33 J, 57, 29/40; 482/28, 29; 83/552, 571; 101/3.1, 4, 79; 72/71

[56] References Cited

U.S. PATENT DOCUMENTS

| | | | |
|---|---|---|---|
| 3,633,998 | 1/1972 | Becic | 101/79 |
| 3,847,078 | 11/1974 | Krembel, Jr. | 101/3.1 |
| 5,259,100 | 11/1993 | Takahashi | 29/33 J |

FOREIGN PATENT DOCUMENTS 61-181667  8/1986  Japan .

*Primary Examiner*—William R. Briggs
*Attorney, Agent, or Firm*—Wigman, Cohen, Leitner & Myers, P.C.

[57] ABSTRACT

A pneumatic marking tool (35,123) is attached to one of the punch mounting holes (9) of the upper turret disk (3) of a punch press. When the punching striker (13) is moved down to its lower dead point, compressed air is supplied from a compressed air supply unit (103) to the marking tool to move the marking stylus (49, 129) up and down repeatedly at a high speed. At the same time, the work (W) is moved in a two-dimensional way by the Y- and X-axis work driving mechanisms (27, 29) of the punch press, in synchronism with the repetitive marking stylus motion, to engrave characters and/or symbols as a form of gathered dots all under control of the numerical control unit (33). Therefore, it is possible to mark or engrave any required characters and/or symbols without occupying a number of punch mounting stations of the upper turret disk and without the use of any punch press of high punching frequency, thus eliminating the laborious setting work required whenever the plate thickness of the work changes.

10 Claims, 6 Drawing Sheets

PUNCH PRESS EQUIPPED WITH MARKING APPARATUS AND METHOD FOR MARKING BY THE PUNCH PRESS

BACKGROUND OF THE INVENTION

1. Field of the Invention

The present invention relates to a punch press equipped with a marking apparatus and a method for marking by the punch press, and more particularly, to the punch press equipped with a marking apparatus adapted to effect marking of characters and symbols on the surface of a metal sheet placed on a worktable of a punch press, and to a method of marking by the punch press.

2. Description of the Prior Art

It is conventional to impress or inscribe a mark or marks (e.g., characters, symbols, etc.) on the surfaces of products (i.e. works) that have been processed by a punch press. In this case, marks are impressed on the surface of a work supported on a worktable of a punch press by utilization of the punching (or pressing) function of the punch press. Thus various data such as product identification data (e.g., a product name, a product number, product dimensions, production data, etc.) and maker's name, etc. are impressed or engraved on the surface of the work.

One of the conventional marking methods is as follows. A plurality of marking dies each formed with type-like protrusion representing specific characters or symbols are mounted on a plurality of punch mounting stations of the turret disk of the punch press. The marking dies are struck by a punching striker of the punch press to engrave characters or symbols on the work surface.

Further, Japanese Unexamined Publication (Kokai) No. 61-81667 discloses a method of stamping segment-characters or segment-symbols. In this method, a marking die formed with a linear projection is mounted on a punch mounting station of the punch press. Whenever the die is struck by a punching striker, a work is moved by a suitable distance by moving a worktable and at the same time the marking die is rotated by a suitable angle by an indexing mechanism. Thus segment-characters or segment-symbols can be stamped on the work by the combination of the motion of the work and the rotation of the linear projection of the marking die.

Still further, there has been a method of stamping dot-characters or dot-symbols. In this method, a marking punch formed with a dot projection is mounted on a punch mounting station of the punch press. Whenever the die is struck by a punching striker, a work is moved slightly in two-horizontal directions by means of the worktable. Thus dot-characters or dot-symbols can be engraved as a form of suitably arranged dots on the work by striking the die marker repeatedly.

In the above-mentioned first method that uses the marking dies each formed with type-like protrusion, whenever the type of the marking is to be changed, the marking dies must be changed or newly manufactured, which limits the flexibility of the marking. Further, when the punch formed with a single character or numeral is used, 36 dies are required for only alphanumerical characters. Thus when these dies are all mounted in the punch mounting stations on the turret disk of the turret punch press, the number of the punch mounting stations available for ordinary punching tools is reduced markedly. For instance, in the case of a turret punch press having 56 stations, the marking dies occupy more than a half of the total punch mounting stations.

On the other hand, in the above-mentioned second prior art that uses a marking die formed with linear marking projection, only a single marking die is mounted on the punch mounting station of the punch press. However, since the characters or symbols are to be formed as the form of segment characters or segment symbols, the marked or engraved characters or symbols are not easily legible; in addition, the types of characters and symbols to be marked is practically limited (for example, a Chinese character of a large number of strokes cannot be marked).

In the above-mentioned third prior art that uses the marking die formed with a dot projection, the characters or symbols can be marked or impressed as a form of suitably arranged dots. Thus there is no practical limit to the types of the characters and symbols to be marked as described above (i.e., a Chinese character of a large number of strokes can be marked). However, there exists problems that since one dot is engraved for each strike, it takes a long time to print even a few characters and symbols. The time required for marking can be reduced with increasing striking frequency (hits/min); however, the price of the punch press having a high striking frequency is expensive.

Further, in all the above-mentioned prior arts, whenever the thickness of the work to be marked changes, additional preparatory steps were necessary for adjusting the position of the marking die on the turret disk, decreasing the processing efficiency.

SUMMARY OF THE INVENTION

With these problems in mind, it is therefore the object of the present invention to provide a punch press with a marking apparatus and a method for marking in the punch press, which allows marking or impressing of various characters and symbols on a work at a high speed, without occupying a large number of the punch mounting stations of the turret disk of the punch press and without increasing the striking frequency of the striker. The apparatus and method also eliminate the additional preparatory steps for the adjustment of marking dies on the turret disk according to the plate thickness of the work to be marked.

To achieve the above-mentioned object, the present invention provides a punch press that includes upper and lower tool holders (3, 9) each formed with tool mounting sections (9, 11) for mounting punches or dies, a striker (13) adapted to selectively strike one of the punches located at a working position, means for moving a work in X- and Y-directions relative to the working position, and a pneumatic marking tool (35, 123) removably mounted on the tool mounting section (9) on the upper tool holder (3). The pneumatic marking tool includes, a body (55, 125) formed with a cylinder chamber (89, A), a piston (87, 131) provided in the cylinder chamber for moving along a longitudinal axis of the cylinder chamber, a marking stylus (49, 129) provided in the body and coupled to the piston in use. The body (55, 125) being formed at its top portion with a inlet port (85H, P) for receiving compressed air and communicating with the cylinder chamber. Further, the striker (13) is formed with a compressed air supply passage (89H) adapted to communicate with the inlet port (85H, P) of the marking tool when the striker is brought into contact with the top portion of the body.

Further the present invention provides a method of marking on a sheet workpiece by using the foregoing punch press. The method includes the steps of:

indexing the pneumatic marking tool at a predetermined working position;

lowering the punching striker so that a lower end of the striker is brought into contact with the top portion of the pneumatic marking tool;

supplying a compressed air from an air compressor to the pneumatic marking tool through the air passage formed in the striker, to move the marking stylus up and down; and moving work to be marked in two dimensional way in synchronism with motion of the marking stylus.

In the apparatus and the method according to the present invention, any required marks of characters and/or symbols can be impressed on a work in a dot-matrix form by the repetitive striking operation of the marking striker of the marking tool, while moving the work W in two-dimensional directions by the Y- and X-axis driving mechanisms. Accordingly, it is possible to mark various required characters and/or symbols at a high speed without need of any punch press of a large punching frequency and without occupying a plurality of punch mounting stations of the upper turret disk. In addition, even if the plate thickness of the work W changes, no special setting work is required.

DETAILED DESCRIPTION OF THE EMBODIMENTS

An embodiment of the present invention will be described hereinbelow with reference to the attached drawings.

Figure 1:
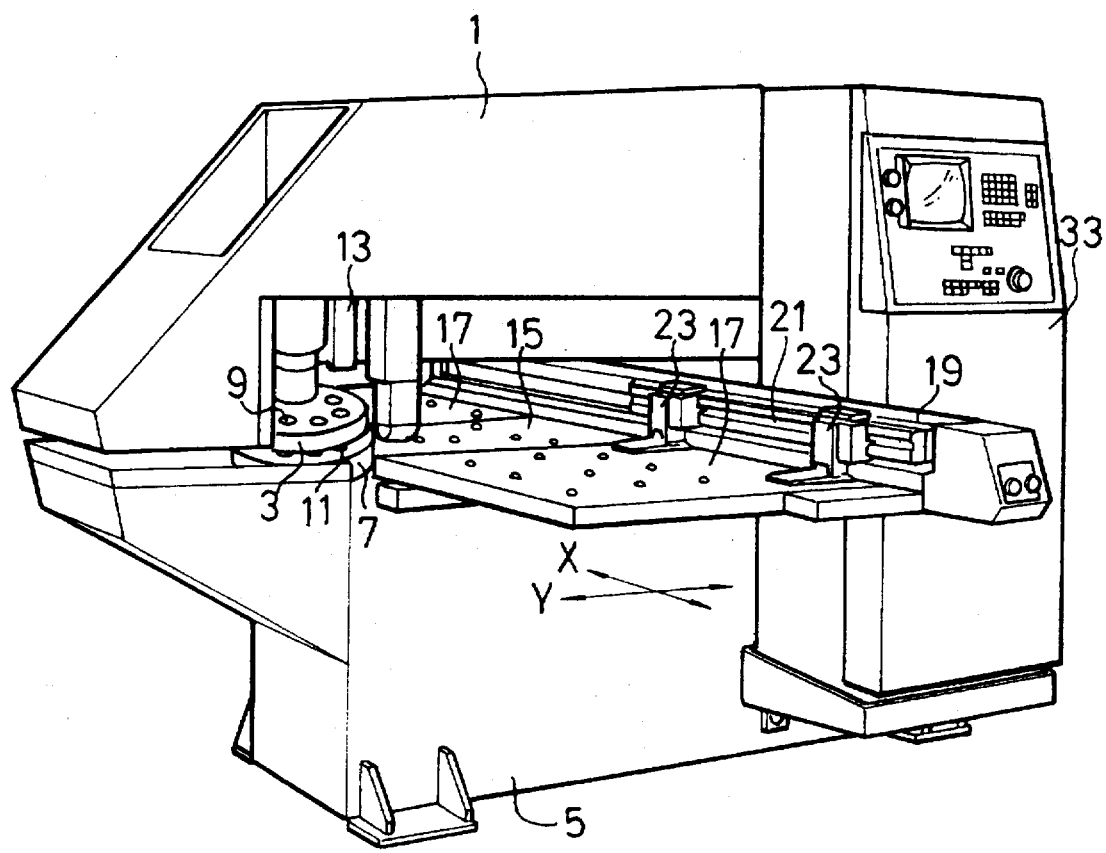
FIG. 1 is a perspective view showing an example of a turret punch press equipped with a marking apparatus according to the present invention.

FIG. 1 shows an example of a turret punch press equipped with a marking apparatus according to the present invention.

In the drawing, the turret punch press is provided with an upper frame 1 and a lower frame 5. An upper turret disk 3 is rotatably mounted on the upper frame 1 and a lower turret disk 7 is rotatably mounted on the lower frame 5 respectively.

The upper turret disk 3 is formed with a plurality of punch mounting holes or stations 9 and the lower turret disk 7 is also formed with a plurality of die mounting holes or stations 11. These turret disks 3 and 7 are rotated or indexed by a predetermined angle in synchronism with each other by an index driving mechanism 25 (see FIG. 3). Thus any desired pair of the punch mounting holes 9 and the die mounting holes 11 can be indexed to the work punching position above which a punching striker 13 is located. Then a punch mounted in the punch mounting hole 9 is struck by the striker 13 driven by a punching striker driving mechanism 31 (see FIG. 3).

On both sides of a center table 15 of the lower frame 5, a pair of side tables 17 are provided so as to be movable horizontally In the Y-axis direction. The pair of side tables 17 are fixed to a carriage base 19 that is also movable in the Y-axis direction and extends in the X-axis direction. In addition, a carriage 21 is attached to the carriage base 19 so as to be movable in the X-axis direction. A plurality of work clamps 23 are mounted on the carriage 21 to clamp a work W (see FIG. 2A or 2B).

Figure 3:
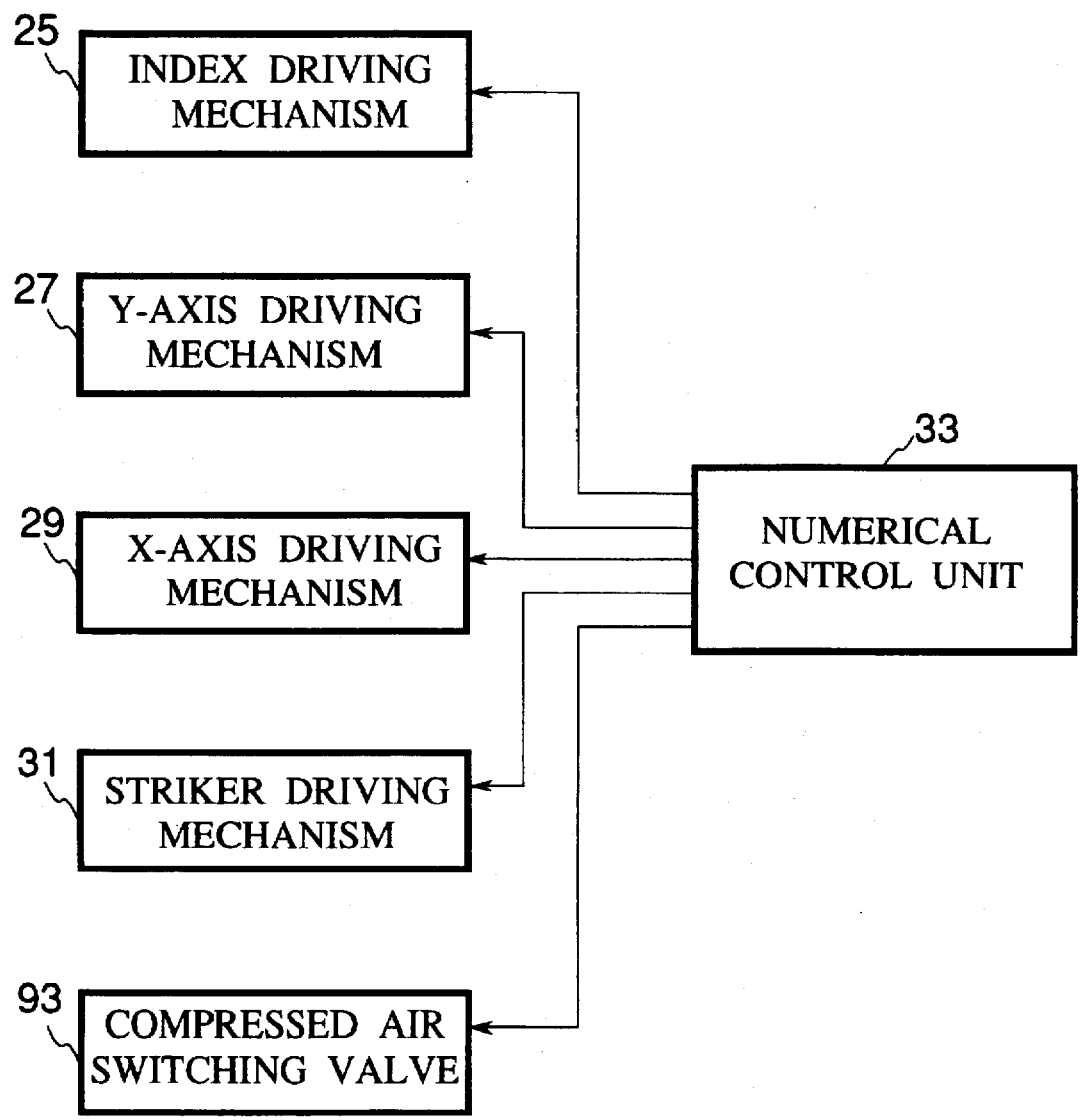
FIG. 3 is a block diagram showing a control system of the punch press according to the present invention.

The side tables 17 and the carriage base 19 can be moved in the Y-axis direction by a Y-axis driving mechanism 27 including a servomotor (see FIG. 3), and the carriage 21 can be moved in the X-axis direction by an X-axis driving mechanism 29 including a servomotor (FIG. 3). Further, as shown in FIG. 1, a numerical control unit 33 is provided for controlling the punch press.

As shown in FIG. 3, the index driving mechanism 25, the Y-axis driving mechanism 27, the X-axis driving mechanism 29, the striker driving mechanism 31, and a compressed air switching valve 93 (described later) are all connected to the numerical control unit 33. Thus these mechanisms can be operated on the basis of various commands determined in accordance with a processing (punching) program stored in the numerical control unit 33, so that the upper and lower turret disks 3 and 7 can be suitably indexed relative to the work punching position, the work W clamped can be located at any desired positions, and the punching striker 13 can be driven at an appropriate timing.

Figure 2A:
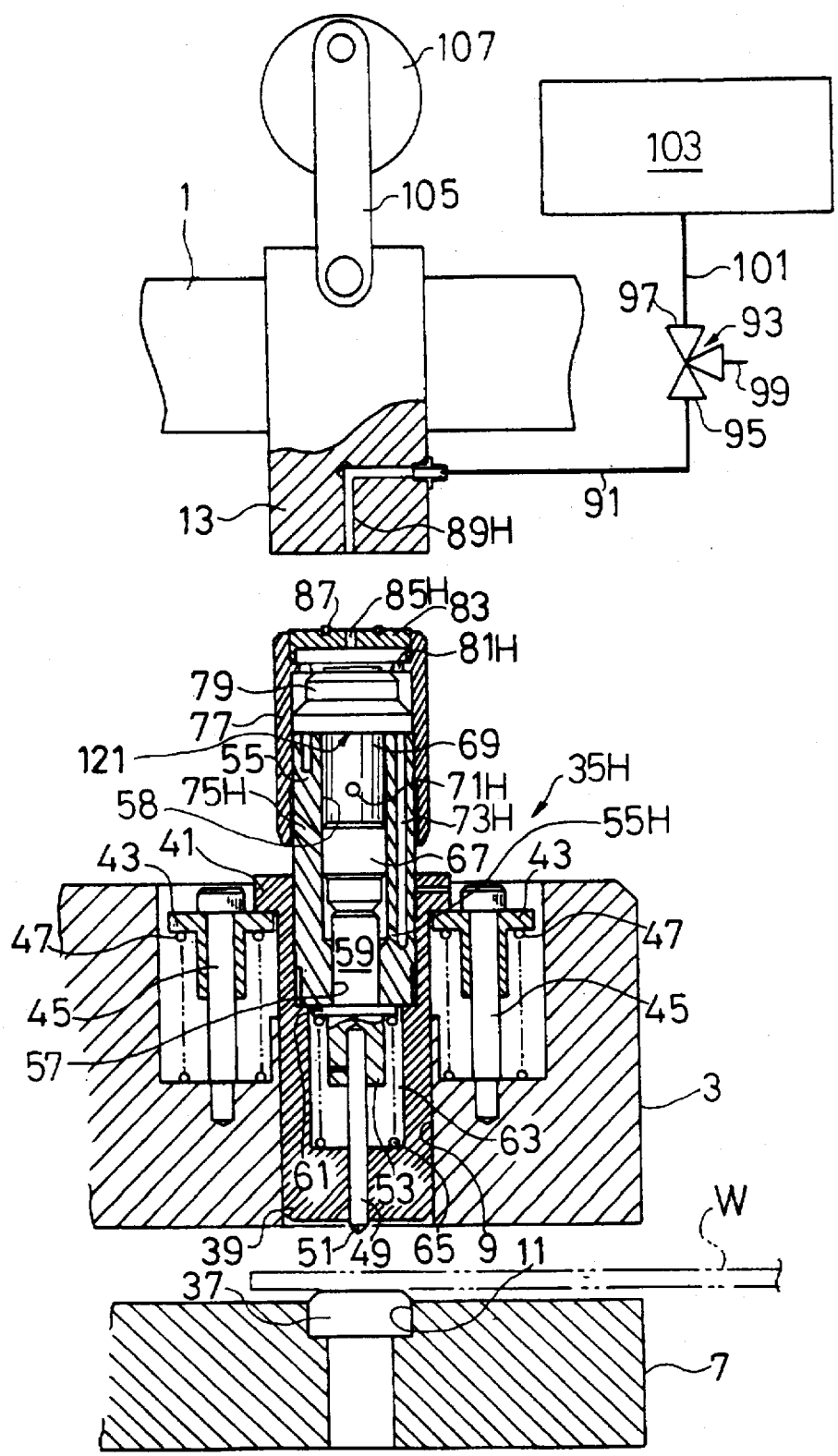
FIG. 2A is an enlarged cross-sectional view showing an important portion of the punch press including the marking apparatus according to the present invention, in which a striker of the punch press is located at an upper dead point.
Figure 2B:
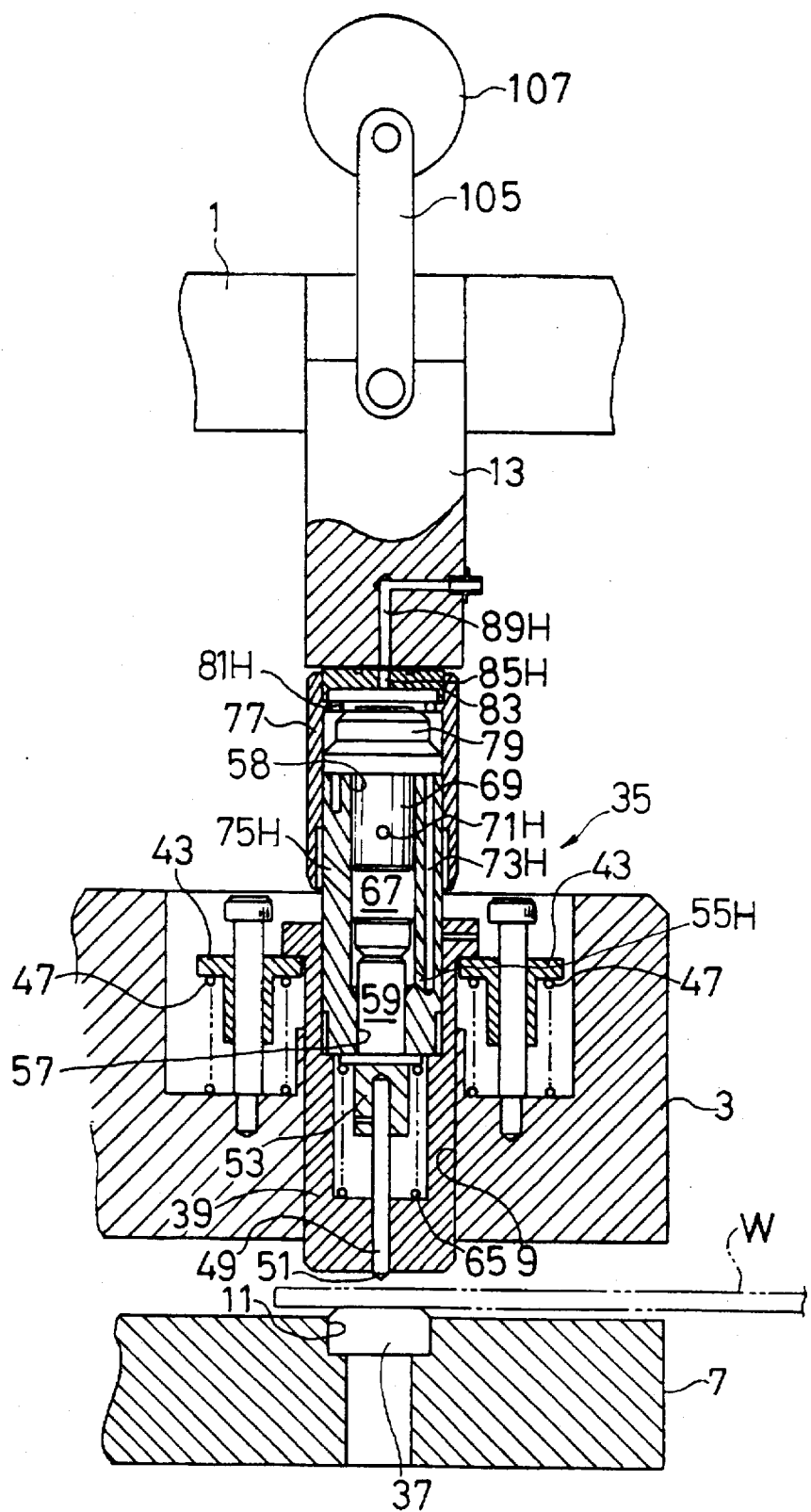
FIG. 2B is an enlarged cross-sectional view showing the same portion of the punch press as shown in FIG. 2A, in which the striker is located at a lower dead point.

With reference to FIGS. 2A and 2B, a marking tool 35 acting as a marking apparatus according to the present invention will be described hereinafter. A feature of the marking tool 35 is that a marking stylus 49 is moved up and down repeatedly by means of compressed air supplied from the striker 13. Thus marks (characters and/or symbols) are impressed on the surface of a work as a form of suitably arranged dots (i.e. by dot-matrix printing).

The marking tool 35 is fitted in one of the punch mounting hole 9 of the upper turret disk 3. A flat die 37 (formed with no hole) is fitted in the die mounting hole 11 of the lower turret disk 7. The upper and lower turret disks 3 and 7 are synchronously indexed by the index driving mechanism so that the marking tool 35 and the flat die 37 are opposed to each other.

The pneumatic marking tool 35 includes a cylinder assembly, a piston assembly and a valve assembly. The cylinder assembly is composed of a cylinder holder 39, a cylinder body 55, an upper cylinder cover 77 and a top pad 83. The piston assembly is composed of a head member 53, an upper connection rod 59 and a piston 67. The valve assembly, which is designated by the numeral 79 in FIG. 2A, is composed of an upper member 109, a lower member 111 and a valve disk 113 (see FIG. 4).

Specifically, as shown in FIG. 2A, a cup-shaped cylinder holder 39 is fitted in the punch mount hole 9 so as to be movable In the vertical direction. An upper flange portion 41 of the cylinder holder 39 is supported by a plurality of lifter retainers 43, which are guided in the vertical direction by the shoulder bolts 45 and urged upward by a lifter spring 47 provided between the lifter retainers 43 and the upper turret disk 3. Thus the cylinder holder 39 1s held at the upper position by the lifter retainers 43. When the punching striker 13 strikes the head of the marking tool 35, the lower portion of the cylinder holder 39 projects downward from the upper turret disk 3, as shown in FIG. 2B.

The cylinder holder 39 guides a marking stylus 49 so as to be movable up and down; the marking stylus 49 is formed with a sharpened pin-shaped end or tip 51 at the bottom thereof. Thus the marking stylus 49 projects from the lower bottom surface of the cylinder holder 39 so that the tip 51 of the marking stylus 49 faces the upper surface of the flat die 37.

The cylinder body 55 is fixed to an upper inner portion of the cylinder holder 39 and Is formed with a vertical air supply passage 73H, an oblique air supply passage 55H, an upper air release passage (or hole) 71H, and a lower air release passage (or hole) 75H.

The upper cylinder cover 77 is attached to the upper portion of the cylinder body 55 with the valve assembly 79 being interposed between the cylinder body 55 and cylinder cover 77. The upper cylinder cover 77 is formed with a plurality of upper air supply passages 81H.

The top pad 83 is attached to the upper most portion of the upper cylinder cover 77 and is formed with a central air passage 85H. This central air passage 85H is adapted to communicate with a bottom air hole 89H formed in the punching striker 13 when the punching striker 13 is located at the lower dead point as shown in FIG. 2B. Further, an airtight O-ring ring 87 is attached to the upper end surface of the top pad 83 so as to surround the compressed air supply port 85H.

The piston assembly will be explained below. The head member 53 having a flange portion 61 is fixed to the upper portion of the marking stylus 49. A compression spring 65 disposed In a chamber 63 of the cylinder holder 39 is engaged with the flange portion 61. Thus the head member 53 is urged upward against the bottom surface of the cylinder body 55. The upper connection rod 59, foxed to the top portion of the head member 53, is fitted in a central hole 57 of the cylinder body 55 for moving in the vertical direction.

In addition, the piston 67 is fitted in a piston hole 58 (whose diameter is larger than that of the central hole 57) of the cylinder body 55 for moving in the vertical direction. This piston 67 can be moved up and down within the piston hole 58. Therefore, when the piston 67 is moved upward and then downward by compressed air, an impact of the downward movement of the piston 67 is applied to the marking stylus 49 via the upper connection rod 59 and the head member 53. Thus the marking stylus 49 is moved downward against an elastic force of the compression spring 65 to impress a dot on the work W. When the piston 67 is moved upward, the head member 53 and the marking stylus 49 are returned by the elastic force of the spring 65 to the uppermost position at which the flange portion 61 is in contact with the bottom surface of the cylinder body 55.

As shown in FIG. 2A, the cylinder body 55 is formed with various passage or holes: a vertical air supply passage 73H formed in the cylinder wall and communicating with the valve assembly 79; an oblique air supply passage SSH communicating with the passage 73H and the cylinder chamber 69; and upper and lower air release passages 71H and 7SH both communicating with the cylinder chamber 69 and the outside.

The valve assembly 79 interposed between the cylinder body 55 and the upper cylinder cover 77 serves to supply a compressed air into the cylinder chamber 69 alternatively from above or below the piston 67 to move the piston 67 up and down, as described later in further detail.

The punching striker 13 is formed with an angled compressed air supply passage 89H. The lower end of the supply passage 89H is adapted to communicate with the compressed air supply port 85H of the top pad 83 when the striker 13 is in the lower dead point, and the other end communicates through an air conduit 91 with an outlet port 95 of a compressed air switch valve 93. The compressed air switch valve 93 has further an inlet port 97 and an air release port 99 in communication with the atmospheric pressure. The inlet port 97 Is connected through an air conduit 101 to a compressed air supply unit 103 such as an air compressor. The compressed air switch valve 93 is an electromagnetic valve, and can connect the outlet port 95 selectively to the inlet port 97 or to the release port 99 in accordance with a signal from the numerical Control unit 33.

The punching striker 13 is mechanically coupled to a drive shaft 107 eccentrically through a connecting rod 105. Thus, when driven by the striker driving mechanism 31 and the drive shaft 107, the punching striker 13 moves up and down reciprocatingly to cooperate with the marking tool 35.

With this arrangement, when the punching striker 13 is brought into contact with the upper surface of the marking tool 35 (i.e. the top pad 83), compressed air is supplied from the compressed air supply unit 103 to the marking tool 35 via the compressed air supply ports 89H and 85H.

Figure 4:
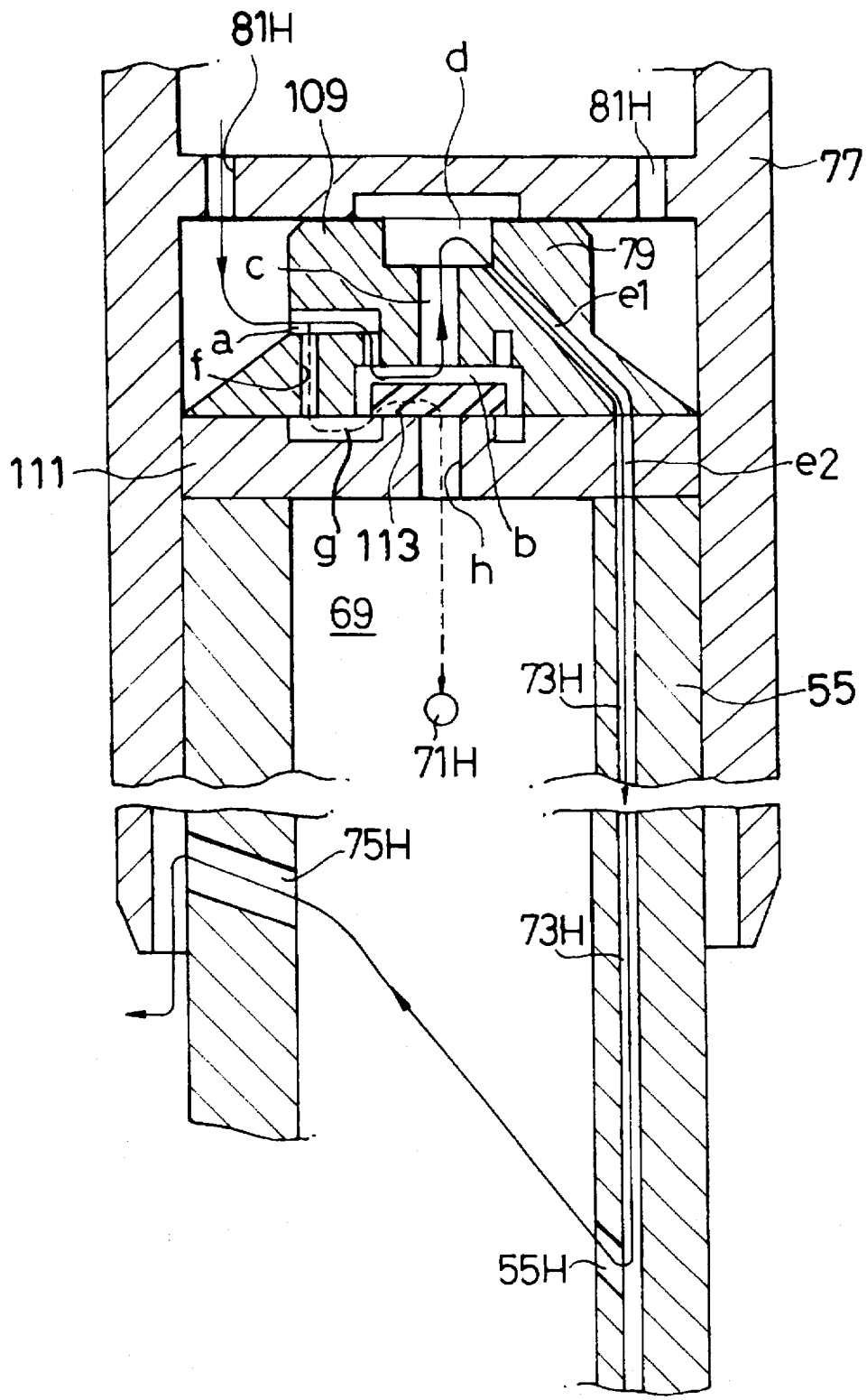
FIG. 4 is an enlarged cross-sectional view showing the valve assembly shown in FIGS. 2A and 2B.

FIG. 4 shows the structure of the valve assembly 79 in detail. The valve assembly 79 is composed of an upper member 109, a lower member 111, and a valve disk 113. The upper member 109 is formed with a plurality of air passages a, b, c, d, e1, and f and the lower member 111 is formed with three air passages e2, g and h. Further, the upper cylinder cover 77 is formed with a plurality of air passages 81H that communicate with the compressed air supply port 85H of the upper pad 83 (see FIG. 2A). As already described, the cylinder body 55 is formed with a plurality of the air passages such as the vertical air supply passage 73H communicating with the passage e2, the oblique air supply passage 55H communicating with the passage 73H and the cylinder chamber 69, the upper air release passage 71H communicating with the cylinder chamber 69 and the outside, and the lower air release passage 75H communicating with the cylinder chamber 69 and the outside as explained above.

When the punching striker 13 is located in the upward position as shown in FIG. 2A, no compressed air is supplied to the marking tool 35.

On the other hand, when the punching striker 13 is lowered to the position as shown in FIG. 2B, compressed air is supplied to the supply port 85H of the top pad 83. In this case, as shown in FIG. 4, the valve disk 113 is initially in the lower position by its own weight. Thus the compressed air from the supply port 85H flows through the air passages 81H, a, b, c, d, e1, e2, 73H and 55H to the lower side of the piston 67 in the cylinder chamber 69 (see also FIG. 2B). In this case, since the lower air release passage 75H is closed by the piston 67, and the upper air release passage 71H is positioned above the piston 67 and therefore opened to the outside, the piston 67 moves upward in the cylinder body 55.

When the piston 67 has been moved upward by a predetermined stroke, the upper air release passage 71H is closed by the piston 67, and conversely the lower air release passage 75H is opened to the outside, releasing the compressed air to the outside through the lower air release passage 75H. Under these conditions, the pressure above the valve disk 113 decreases to atmospheric pressure via the passages 75H, 55H, 73H, e2, e1, d and c. Further the pressure under the valve disk 113 in passage h increases because of the inertial upward motion of the piston 67. Thus the valve disk 113 is moved upward toward the upper member 109 of the valve assembly 79 to switch the path of the air flow from the passages a, b, and c to the passages a, f, g and h. That is, since air passage c is closed by the valve disk 113, the compressed air flows through the passages a, f, g and h to the upper side of the piston 67 in the cylinder chamber 69, to move the piston 67 downward. In this case, since the upper air passage 71H 1s closed by the piston 67, and the lower air release passage 75H is opened to the outside, the piston 67 moves downward in the cylinder body 55.

When the piston 67 has moved downward by a predetermined stroke, the lower air release passage 75H is again closed by the piston 67, and the upper air passage 71H is opened. Thus the compressed air above the piston 67 is released to the outside through the upper air release passage 71H, so that the pressure under the valve disk 113 is lowered to atmospheric pressure. On the other hand, the pressure above the valve disk 113 increases because of a compressed air flow through passages 55H, 73H, e2, e1, d, c and b which is produced by the inertial downward motion of the piston 67. As a result, the valve disk 113 is moved downward toward the lower member 111 of the valve assembly 79, as illustrated in FIG. 4. After that, the operation as described above is repeated automatically so that the piston 67 can be moved up and down repeatedly. As a result, the piston 67 strikes the upper connection rod 59 repeatedly, and the head member 53 fixed to the marking stylus 49 is moved up and down In cooperation with the elastic force of the compression spring 65, so that dots can be formed on the surface of the work W.

In this manner the piston 67 can be moved up and down at a high speed in accordance with the supplied compressed air, on the basis of the switching action produced by the valve assembly 79 and the reciprocal motion of the piston in the cylinder body formed with the air passages. Thus the head member 53 having the marking stylus 49 is struck through the upper connection rod 59 by the piston 67.

In the embodiment as described above, the pneumatic marking tool 35 Including the valve assembly 79 is used. However, it is also possible to use an air hammer as manufactured by U.S. Dayton Electric Mfg. Co., for instance, instead of the pneumatic marking tool 35.

The overall operation of the punch press equipped with the marking apparatus will be explained hereinbelow.

Under the initial conditions as shown in FIG. 2A, the punching striker 13 is located at the upper dead point. The marking tool 35 and the flat die 37 mounted in the mounting holes 9, 11 of the upper and lower turret disks 3, 7 are located at the processing position under the striker 13. Further, the workpiece W mounted on the center table 15 and the two side tables 17 and clamped by the work clamps 23 is moved in the Y-axis direction by the carriage base 19 and in the X-axis direction by the carriage 21 so that the marking start point on the workpiece matches the processing position.

Under these initial conditions, the drive shaft 107 is rotated by the striker driving mechanism 31 to locate the punching striker 13 to the lower dead point as shown in FIG. 2B.

Then, the punching striker 18 is brought into contact with the top pad 83 of the marking tool 35 and further pushes the marking tool 35 downward, so that the entire marking tool 35 is lowered against an elastic force of the lifter springs 47. Then, the lower end 51 of the marking stylus 49 is located at a position immediately above the surface of the workpiece W. At this time, the compressed air supply passage 89H of the punching striker 13 is connected to the compressed air supply port 85H of the marking tool 35 (i.e. of the top pad 83).

Now, when the numerical control unit 83 outputs a marking start command, the compressed air switch valve 93 is activated to connect the outlet port 95 with the compressed air supply port 97 (instead of the atmospheric release port 99), so that compressed air is supplied from the compressed air supply unit 103 to the compressed air supply port 85H of the marking tool 35. Therefore the compressed air is supplied to the valve assembly 79 through the air passages 81H formed in the upper cylinder cover 77. Consequently, the compressed air is supplied first to the lower side of the piston 67 in the 35 cylinder chamber 69 and then to the upper side thereof and the operation continues alternately, as already explained in detail with reference to FIG. 4. Therefore the piston 67 can be moved up and down alternatively at a high speed (e.g., 3000 times per minute) to strike the upper connection rod 59, so that the head member 53 having the marking stylus 49 strikes the workpiece W repeatedly at high speed to impress dots on the surface of the work W.

At the same time, the work W is moved and located in positions by moving the side tables 17 and the carriage base 19 in the Y-axis direction with the Y-axis driving mechanism 27 and by moving the carriage 21 in the X-axis direction with the X-axis driving mechanism 29 in accordance with the work moving commands output from the numerical control unit 33. As a result, characters or symbols are impressed on the work as a form of dot matrix due to the combination of the reciprocal striking operation of the marking stylus 49 and the two-dimensional shifting motion of the work W.

At each discontinuous portion between the lines composing a character or at each space between the two adjacent characters, the compressed air switching valve 93 is reversed so that the outlet port 95 is connected to the atmospheric release port 99, instead of the compressed air supply port 97. Then, since the compressed air supply port 85H is released to the atmospheric pressure, the reciprocal operation of the marking tool 35 is interrupted, and the tip end 51 of the marking stylus 49 is kept at a position away from the work W. Under these conditions, the work W is moved by the side tables 17 and the carriage base 19 in the Y-axis direction and by the carriage 21 in the X-axis direction.

As described above, in the punch press with the marking apparatus according to the present invention, marks indicative of characters and/or symbols can be engraved on the work W by means of the pneumatic marking tool 35 and in accordance with the movement locus of the work W moved in both the Y- and X-axis directions and the switching operation of the compressed air switch valve 93. Thus, it is possible to freely determine the sizes, fonts, mark positions, etc. of characters and/or symbols engraved on the work W on the basis of the two-dimensional movement commands for the Y- and X-axis work driving mechanisms 27 and 29 and the switching operation commands for the compressed air switch valve 93 both determined in accordance with software (marking NC program) executed by the numerical control unit 33.

Further, the marking tool 35 is designed to stop at a predetermined height a small distance away from the workpiece having the maximum plate thickness. Thus the change in the plate thickness of the work W can be absorbed by the stroke of the marking stylus 49 of the marking tool 35. For instance, if the stroke of the stylus is 1 mm for a plate with thickness 6 mm, the stylus stroke become 6 mm for a plate with thickness 1 mm. This adjustment of the stroke is carried out by the stylus by itself. This is because the marking stylus 49 is moved downward by a shock applied by the up-and-down motion of the piston 67. Further even if the stroke of the marking stylus 49 changes according to the plate thickness of work, the continuous marking operation is maintained.

Figure 5:
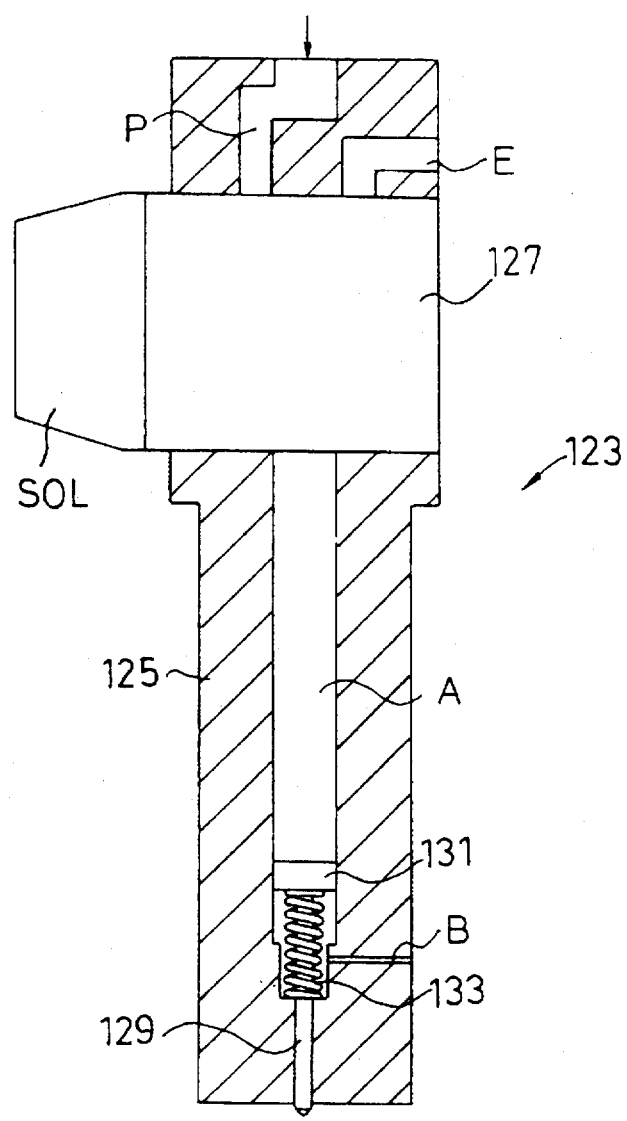
FIG. 5 is a longitudinal cross-sectional view showing an another embodiment of the marking tool used for the marking apparatus according to the present invention.
Figure 6:
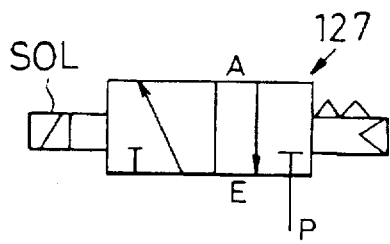
FIG. 6 is an illustration showing a solenoid valve used for the marking tool shown in FIG. 5.

FIG. 5 shows another embodiment 123 of the marking tool. The marking tool 123 includes a tool body 125 extending in the vertical direction, a solenoid valve 127 having a solenoid SOL as shown In FIG. 6, a piston 131 slidably fitted in a central air passage A formed In the tool body 125, a marking stylus 129 fixed to the piston 131 and a spring 133 for urging the piston 131 upward. The tool body 125 is formed with an upper air supply passage P and an upper air release passage E on the upper side of the solenoid SOL and with the central air passage A and a lower air release passage B on the lower side of the solenoid SOL.

In the marking tool 123 shown in FIG. 5, when the punching striker 13 is lowered to the lower dead point, the compressed air supply passage 89H of the punching striker 13 communicates with the upper air supply passage P. Thus, a compressed air from the compressed air supply unit 103 is supplied to the upper air supply passage P. Under these conditions, when the solenoid SOL of the solenoid valve 127 is energized, the upper air supply passage P communicates with the central air passage A. Thus, the supplied compressed air is fed to the passage A, so that the piston 131 is lowered against the elastic force of the spring 133 and the lower end of the marking stylus 129 engraves a dot on the work W. Here, the air under the piston 131 is released through the lower air release passage B.

When the solenoid SOL is deenergized the compressed air flow from the upper air supply passage P to the central air passage A is shut off, and the compressed air is released to the outside through the upper air release passage E. Thus, the marking stylus 129 is returned to the original position by the elastic force of the spring 133. Here, since the solenoid SOL of the solenoid value 127 can be switched on and off at a speed of about 1200 times per minute, it is possible to engrave dot matrix characters and/or symbols on the work W at high speed.

As described above, in the apparatus and method according to the present invention, any required marks of characters and/or symbols can be engraved on a workpiece in a dot matrix form by the repetitive striking of the marking stylus of the marking tool at a high speed irrespective of the punching frequency of the punch press. This is accomplished by intermittently supplying compressed air to the cylinder section above the piston connected to the marking stylus, while moving the work W in two-dimensional directions by the Y- and X-axis driving mechanisms. Accordingly, it is possible to mark various required characters and/or symbols at a high speed without requiring a punch press of a high punching frequency and without occupying a plurality of punch mounting stations of the turret disks. In addition, even when the plate thickness of the work W changes, no special preparation work is required.

What is claimed is:

1. A punch press comprising:
   upper and lower tool holders each formed with tool mounting sections for mounting punches or dies;
   a striker adapted to selectively strike one of the punches located at a working position;
   means for moving a workpiece in X- and Y-directions relative to the working position; and
   a pneumatic marking tool removably mounted on the tool mounting section on the upper tool holder, the pneumatic marking tool including:
      a body formed with a cylinder chamber;
      a piston provided in the cylinder chamber for moving along a longitudinal axis of the cylinder chamber;
      a marking stylus provided in the body and operatively coupled to the piston; and
      the body being formed at its top portion with an inlet port for receiving compressed air and communicating with the cylinder chamber;
   wherein the striker is formed with a compressed air supply passage adapted to communicate with the inlet port of the marking tool when the striker is brought into contact with the top portion of the body.

2. The punch press as recited in claim 1, wherein the work moving means is adapted to move the work in the Y- and X-directions in synchronism with the repetitive striking motion of the marking stylus to engrave a mark in dot-matrix manner.

3. The punch press as recited in claim 1, wherein the body of the pneumatic marking tool is urged to a predetermined upward position by elastic means.

4. The punch press as recited in claim 1, wherein the pneumatic marking tool further includes a valve assembly for repeatedly supplying the compressed air into said cylinder chamber from above and under said piston alternately through the air supply and release passages formed in the body.

5. The punch press as recited in claim 4, wherein the body of the marking tool is formed with a vertical air supply passage and an oblique air supply passage both for supplying the compressed air to a lower side of said piston, an upper air release passage for releasing the compressed air when said piston is moved beyond a predetermined downward stroke, and a lower air release passage for releasing the compressed air when said piston is moved beyond a predetermined upward stroke.

6. The punch press as recited in claim 4, wherein the marking tool further includes:
   a head assembly provided in a cylinder chamber below the piston for moving along the longitudinal axis of the cylinder chamber, the head assembly including:
      an upper connection rod adapted to be struck by the piston when the piston is lowered;
      a flange portion engageable with a section of the body to limit the movement of the head assembly toward the piston; and
      a head member on which an upper section of the marking stylus is secured; and
   an elastic member provided between the head assembly and the body, for urging the head assembly toward the piston.

7. The punch press as recited in claim 5, wherein said valve assembly includes:
   an upper member formed with a plurality of air passages including a disk air passage;
   a lower member formed with a lower air passage communicating with a vertical air supply passage of the body, and a central air passage communicating with a section of the cylinder chamber above the piston; and
   a valve disk loosely disposed in the disk air passage, for selectively opening and closing the central air passage of said lower member due to difference between pressures at upper and lower sides thereof, said piston being moved up and down alternately on the basis of switching operation of said air supply and release passages formed in the cylinder body by the moving piston and switching operation of said valve disk of said valve assembly.

8. The punch press as recited in claim 1, wherein the pneumatic marking tool comprises:

a tool body formed with an upper air supply passage, an upper air release passage, a central air passage, and a lower air release passage;

a piston having a marking stylus and movably fitted to the central air passage of the tool body;

a spring for urging the piston upward; and a solenoid valve having a solenoid for selectively switching the air passages in such a way that the upper air supply passage can communicate with the central air passage to move the piston downward and can communicate with the upper air release passage to move the piston upward by an elastic force of the spring.

9. A method of marking on work by means of a punch press, the punch press including:

upper and lower turrets each formed with tool mounting sections for mounting punches or dies;

a striker adapted to selectively strike one of the punches located at a working position;

means for moving a work in X- and Y-directions relative to the working position; and a pneumatic marking tool removably mounted on the tool mounting section on the upper tool holder, the pneumatic marking tool including;

a body formed with a cylinder chamber;

a piston provided in the cylinder chamber for moving along a longitudinal axis of the cylinder chamber;

a marking stylus provided in the body and operatively coupled to the piston; and a body being formed at its top portion with an inlet port for receiving compressed air and communicating with the cylinder chamber;

wherein the striker is formed with a compressed air supply passage adapted to communicate with the inlet port of the marking tool when the striker is brought into contact with the top portion of the body, the method comprising the steps of:

indexing the pneumatic marking tool at a predetermined working position;

lowering the punching striker so that a lower end of the striker is brought into contact with the top portion of the pneumatic marking tool;

supplying a compressed air from an air compressor to the pneumatic marking tool through the air passage formed in the striker, to move the marking stylus up and down; and moving work to be marked in two dimensional way in synchronism with motion of the marking stylus.

10. The method of marking on work as recited in claim 9, further comprising the step of interrupting the compressed air supply from the air compressor to the pneumatic marking tool after a completion of marking of a portion of a mark.

* * * * *